(12) United States Patent
You et al.

(10) Patent No.: US 6,852,367 B2
(45) Date of Patent: Feb. 8, 2005

(54) STABLE COMPOSITION

(75) Inventors: Yujian You, Lansdale, PA (US); Robert H. Gore, Southampton, PA (US); Michael K. Gallagher, Hopkinton, MA (US)

(73) Assignee: Shipley Company, L.L.C., Marlborough, MA (US)

( * ) Notice: Subject to any disclaimer, the term of this patent is extended or adjusted under 35 U.S.C. 154(b) by 42 days.

(21) Appl. No.: 10/194,851

(22) Filed: Jul. 12, 2002

(65) Prior Publication Data

US 2003/0100644 A1 May 29, 2003

Related U.S. Application Data

(60) Provisional application No. 60/331,911, filed on Nov. 20, 2001.

(51) Int. Cl.[7] .................................................. B05D 7/24
(52) U.S. Cl. ...................... 427/387; 525/477; 528/588; 528/284; 528/39; 528/10; 528/35
(58) Field of Search ....................... 427/387; 525/477; 528/588, 284, 30, 10, 35

(56) References Cited

PUBLICATIONS

Weast et al. CRC Handbook of Chemistry and Physics, 61st Ed., (1981), pp. D–165 to D–166.*

* cited by examiner

*Primary Examiner*—Kuo-Liang Peng
(74) *Attorney, Agent, or Firm*—S. Matthew Cairns

(57) ABSTRACT

Disclosed are stable organo polysilica resin composition containing a B-staged organo polysilica resin and an organic acid, methods of stabilizing such B-staged organo polysilica resin compositions and methods of manufacturing electronic devices using such stable compositions.

18 Claims, No Drawings

STABLE COMPOSITION

This application claims the benefit of U.S. Provisional Application No. 60/331,911, filed on Nov. 20, 2001.

BACKGROUND OF THE INVENTION

The present invention relates generally to the field of stabilization of B-staged dielectric material compositions, In particular, the present invention relates to the stabilization of organo polysilica material compositions.

Organo polysilica materials are well known in art to be useful as precursor materials to organo-silicon containing coatings. Such coatings have found applicability as scratch resistant coatings, insulators (dielectric materials), etch stop layers, hard mask layers, anti-reflective coatings, sound barriers, thermal breaks, insulation, optical coatings and the like. Recently, organic polysilica materials have been of interest as insulating materials.

U.S. Pat. No. 4,349,609 (Takeda et al.) discloses organo polysilica compositions particularly suitable for use as dielectric materials in the manufacture of integrated circuits. Much effort has been devoted to lowering the dielectric constant of such materials by incorporating voids into films of organic polysilica materials. For example, see U.S. Pat. No. 5,895,263 (Carter et al.) and U.S. Pat. No. 6,271,273 B1 (You et al.) which disclose processes for manufacturing an integrated circuit device containing a porous organo polysilica dielectric layer.

The organo polysilica material is typically applied to a substrate in a B-staged form in a solution. Such B-staged material includes monomeric, oligomeric or even polymeric material that is further cured, such as by condensation, to form higher molecular weight materials, such as cured films or coatings. Organic solvents are typically used to prepare such coating solutions of the B-staged organo polysilica material.

The preparation of B-staged organo polysilica material is well-known. Typically, an alkyltrialkoxy silane is reacted with water in the presence of an acid catalyst to form a siloxane partial condensation product. For example, see U.S. Pat. No. 3,389,114 (Burzynski et al.) which discloses the preparation of methyl silsesquioxane by reacting methyltriethoxysilane with water in the presence of up to 700 ppm of hydrochloric acid as a catalyst. Burzynski further found that harder alkyl polysiloxanes following cure can be attained by using greater than 700 ppm of formic acid, see U.S. Pat. No. 4,223,121. A variety of other organic acids are known to catalyze the condensation of alkyl or phenyl trialkoxy or trihalo silanes. Such acids are typically used to buffer the pH of the reaction mixture in order to control the hydrolysis rate. These acids include propionic, butyric, citric, benzoic, acetic, oxalic, chloroacetic, glutaric, glycolic, maleic, malonic, dimethylmalonic, and para-toluenesulfonic. See, for example, U.S. Pat. No. 4,324,712 (Vaughn) and International Patent Application WO 01/41541 (Gasworth et al.).

B-Staged organo polysilica resins are prone to self-condensation, which increases the molecular weight of the resins and thereby affecting other properties of the resins. Most notably, change occurs in coating solutions where the viscosity, coating thickness and uniformity are significantly impacted. Also, the increase in molecular weight results in formation of gel particles which lead to coating defects. This is especially problematic in applications where the optical quality of the coating is important. For example, in optical wave-guides gel particles can lead to regions in the device that cause light to scatter. In scratch-resistant coatings such as on eye glass lenses, gel particles cause aberrations that are unattractive and interfere with the wearer's vision. The increase in organo polysilica resin molecular weight over time and the formation of gel particles leads to a short shelf life for many products that contain organo polysilica resins.

Conventionally, solutions of B-staged organo polysilica resins are stored cold in order to decrease such self-condensation reactions and increase their shelf life. The solutions must be shipped using refrigerated transportation and/or containers. Such cold storage requirements greatly adds to the cost of handling these materials. Thus, there is a need for improved shelf life of B-staged organo polysilica resins.

U.S. Pat. No. 5,993,532 (Broderick et al.) discloses stable hydrogen silsesquioxane compositions containing 100 parts by weight solvent, 0.1 to 100 parts by weight hydrogen silsesquioxane and 0.002 to 4 parts by weight acid. A variety of organic and inorganic acids are disclosed. There is no mention in this patent of organo polysilica resins.

U.S. Pat. No. 6,235,101 B1 (Kurosawa et al.) discloses a composition including a hydrozylate and/or partial condensate of a compound of the formula $R^1{}_n Si(OR^2)_{4-n}$, where $R^1$ and $R^2$ are ($C_1$–$C_5$) alkyl or ($C_6$–$C_{20}$) aryl and n is 1 or 2; a metal chelate compound; an organic solvent having a boiling point of 110° to 180° C.; and a β-diketone. These compositions may also contain a tetrafunctional alkoxysilane, such as tetramethoxysilane or tetraethoxysilane. These tetrafunctional alkoxysilanes are disclosed to provide a degree of storage stability to the compositions. It is also disclosed that certain carboxylic acids can be added to these compositions. However, neither the function of such carboxylic acids nor the amounts of such acids nor the pKa values of such acids are disclosed.

U.S. Pat. No. 2,986,548 (McLoughlin) discloses organopolysiloxane resin compositions containing an alkaline condensation catalyst, such as a quaternary ammonium compound, that have increased shelf life by the addition of a halogenated acid. This patent teaches that such halogenated acids are required to prevent premature curing of the resin by the condensation catalyst. Nothing in this patent discloses the stabilization of organopolysiloxane resins in the absence of such alkaline condensation catalyst.

SUMMARY OF THE INVENTION

It has been surprisingly found that certain organic acids stabilize B-staged organo polysilica resins against self-condensation reactions and gel formation. Such organic acids stabilize the organo polysilica resins in low levels.

In one aspect, the present invention provides a stable composition including a B-staged organo polysilica resin and an organic acid having 2 carbons or more and having a pKa of about 1 to about 4, wherein the composition is substantially free of alcohol of reaction.

In another aspect, the present invention provides a stable composition including a B-staged organo polysilica resin, porogens and an organic acid having 2 carbons or more and having a pKa of about 1 to about 4, wherein the composition is substantially free of alcohol of reaction.

In yet another aspect, the present invention provides a stable composition including a B-staged organo polysilica resin and an organic acid capable of functioning as a chelating agent, wherein the composition is substantially free of alcohol of reaction.

In a further aspect, the present invention provides a method of stabilizing a B-staged organo polysilica resin including the steps of: a) providing a B-staged organo polysilica resin substantially free of alcohol of reaction; and b) adding an amount of organic acid having at least 2 carbons and a pKa of about 1 to about 4 in an amount less than that sufficient to cause gellation.

In a still further aspect, the present invention provides a method of manufacturing an electronic device including forming a porous organo polysilica dielectric material including the steps of: a) disposing on an electronic device substrate a stable composition including a B-staged organo polysilica resin, porogens and an organic acid having 2 carbons or more and having a pKa of about 1 to about 4, wherein the composition is substantially free of alcohol of reaction; b) curing the B-staged organo polysilica resin to form an organo polysilica dielectric material; and c) removing the porogens to provide a porous organo polysilica material disposed on the substrate.

DETAILED DESCRIPTION OF THE INVENTION

As used throughout this specification, the following abbreviations shall have the following meanings, unless the context clearly indicates otherwise: ° C.=degrees centigrade; μm=micron=micrometer; ppm=parts per million; UV=ultraviolet; rpm=revolutions per minute; nm=nanometer; g=gram; wt %=weight percent; L=liter; Cst=centistokes; and mL=milliliters.

The term "(meth)acrylic" includes both acrylic and methacrylic and the term "(meth)acrylate" includes both acrylate and methacrylate. Likewise, the term "(meth)acrylamide" refers to both acrylamide and methacrylamide. "Alkyl" includes straight chain, branched and cyclic alkyl groups. "Aryl" includes any aromatic group, and preferably those containing 6 to 20 carbon atoms.

The term "porogen" refers to a pore forming material, that is a polymeric material or particle dispersed in an organo polysilica material that is subsequently removed to yield pores, voids or free volume in the organo polysilica material. Thus, the terms "removable porogen," "removable polymer" and "removable particle" are used interchangeably throughout this specification. The terms "pore" and "void" are used interchangeably throughout this specification. "Cross-linker" and "cross-linking agent" are used interchangeably throughout this specification. "Polymer" refers to polymers and oligomers. The term "polymer" also includes homopolymers and copolymers. The terms "oligomer" and "oligomeric" refer to dimers, trimers, tetramers and the like. "Monomer" refers to any ethylenically or acetylenically unsaturated compound capable of being polymerized. Such monomers may contain one or more double or triple bonds.

The term "B-staged" refers to uncured organo polysilica resins. By "uncured" is meant any organo polysilica resin that can be polymerized or cured, such as by condensation, to form higher molecular weight materials, such as coatings or films. Such B-staged material may be monomeric, oligomeric or mixtures thereof. B-staged material is further intended to include mixtures of polymeric material with monomers, oligomers or a mixture of monomers and oligomers.

The term "hydrolyzate" refers to an oligomeric or polymeric material formed by the hydrolysis of silane(s) and includes the term "cohydrolyzate". "Cohydrolyzate" refers to an oligomeric or polymeric material prepared by the hydrolysis of two or more silanes. "Partical condensate" refers to an oligomeric or polymeric material prepared by the partial condensation of silane(s) and includes the term "partial cocondensate". Likewise, the term "partial cocondensate" refers to an oligomeric or polymeric material prepared by the partial condensation of two or more silanes.

"Halo" refers to fluoro, chloro, bromo and iodo. Likewise, "halogenated" refers to fluorinated, chlorinated, brominated and iodinated. Unless otherwise noted, all amounts are percent by weight and all ratios are by weight. All numerical ranges are inclusive and combinable.

The present invention provides a stable composition including one or more B-staged organo polysilica resins and an organic acid having 2 carbons or more and having a pKa of about 1 to about 4, wherein the composition is substantially free of alcohol of reaction. By B-staged organo polysilica resin (or organo siloxane) is meant a compound including silicon, carbon, oxygen and hydrogen atoms. Suitable organo polysilica resins are hydrolyzates or partial condensates of one or more silanes of formulae (I) or (II):

$$R_a SiY_{4-a} \tag{I}$$

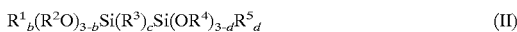

$$R^1_b(R^2O)_{3-b}Si(R^3)_c Si(OR^4)_{3-d} R^5_d \tag{II}$$

wherein R is hydrogen, $(C_1-C_8)$alkyl, aryl, and substituted aryl; Y is any hydrolyzable group; a is an integer of 0 to 2; $R^1$, $R^2$, $R^4$ and $R^5$ are independently selected from hydrogen, $(C_1-C_6)$alkyl, aryl, and substituted aryl; $R^3$ is selected from $(C_1-C_{10})$alkyl, —$(CH_2)_h$—, —$(CH_2)_{h1}$-$E_k$-$(CH_2)_{h2}$—, —$(CH_2)_n$-Z, arylene, substituted arylene, and arylene ether; E is selected from oxygen, $NR^6$ and Z; Z is selected from aryl and substituted aryl; $R^6$ is selected from hydrogen, $(C_1-C_6)$alkyl, aryl and substituted aryl; b and d are each an integer of 0 to 2; c is an integer of 0 to 6; and h, h1, h2 and k are independently an integer from 1 to 6; provided that at least one of R, $R^1$, $R^3$ and $R^5$ is not hydrogen. "Substituted aryl" and "substituted arylene" refer to an aryl or arylene group having one or more of its hydrogens replaced by another substituent group, such as cyano, hydroxy, mercapto, halo, $(C_1-C_6)$alkyl, $(C_1-C_6)$ alkoxy, and the like.

It is preferred that R is $(C_1-C_4)$alkyl or phenyl, and more preferably methyl, ethyl, iso-butyl, tert-butyl or phenyl. Preferably, a is 1. Suitable hydrolyzable groups for Y include, but are not limited to, halo, $(C_1-C_6)$alkoxy, acyloxy and the like. Preferred hydrolyzable groups are chloro and $(C_1-C_2)$alkoxy. Suitable organosilanes of formula (I) include, but are not limited to, methyl trimethoxysilane, methyl triethoxysilane, phenyl trimethoxysilane, phenyl triethoxysilane, tolyl trimethoxysilane, tolyl triethoxysilane, propyl tripropoxysilane, iso-propyl triethoxysilane, iso-propyl tripropoxysilane, ethyl trimethoxysilane, ethyl triethoxysilane, iso-butyl triethoxysilane, iso-butyl trimethoxysilane, tert-butyl triethoxysilane, tert-butyl trimethoxysilane, cyclohexyl trimethoxysilane and cyclohexyl triethoxysilane.

Organosilanes of formula (II) preferably include those wherein $R^1$ and $R^5$ are independently $(C_1-C_4)$alkyl or phenyl. Preferably $R^1$ and $R^5$ are methyl, ethyl, tert-butyl, iso-butyl and phenyl. It is also preferred that b and d are independently 1 or 2. Preferably $R^3$ is $(C_1-C_{10})$alkyl, —$(CH_2)_h$—, arylene, arylene ether and —$(CH_2)_{h1}$-E-$(CH_2)_{h2}$. Suitable compound of formula (II) include, but are not limited to, those wherein $R^3$ is methylene, ethylene, propylene, butylene, hexylene, norbornylene, cycloheylene, phenylene, phenylene ether, naphthylene and —$CH_2$—$C_6H_4$—$CH_2$—. It is further preferred that c is 1 to 4.

Suitable organosilanes of formula (II) include, but are not limited to, bis(hexamethoxysilyl)methane, bis(hexaethoxysilyl)methane, bis(hexaphenoxysilyl)methane, bis(dimethoxymethylsilyl)methane, bis(diethoxymethylsilyl)methane, bis(dimethoxyphenylsilyl)methane, bis(diethoxyphenylsilyl)methane, bis(methoxydimethylsilyl)methane, bis(ethoxydimethylsilyl)methane, bis(methoxydiphenylsilyl)methane, bis(ethoxydiphenylsilyl)methane, bis(hexamethoxysilyl)ethane, bis(hexaethoxysilyl)ethane, bis(hexaphenoxysilyl)ethane, bis(dimethoxymethylsilyl) ethane, bis(diethoxymethylsilyl)ethane, bis(dimethoxyphenylsilyl)ethane, bis(diethoxyphenylsilyl)ethane, bis(methoxydimethylsilyl)ethane, bis(ethoxydimethylsilyl)ethane, bis(methoxydiphenylsilyl)ethane, bis(ethoxydiphenylsilyl)ethane, 1,3-bis(hexamethoxysilyl))propane, 1,3-bis(hexaethoxysilyl)propane, 1,3-bis(hexaphenoxysilyl)propane, 1,3-bis(dimethoxymethylsilyl)propane, 1,3-bis(diethoxymethylsilyl)propane, 1,3-bis(dimethoxyphenylsilyl)propane, 1,3-bis(diethoxyphenylsilyl)propane, 1,3-bis(methoxydimehylsilyl)propane, 1,3-bis(ethoxydimethylsilyl)propane, 1,3-bis(methoxydiphenylsilyl)propane, and 1,3-bis(ethoxydiphenylsilyl)propane. Preferred of these are hexamethoxydisilane, hexaethoxydisilane, hexaphenoxydisilane, 1,1,2,2-tetramethoxy-1,2-dimethyldisilane, 1,1,2,2-tetraethoxy-1,2-dimethyldisilane, 1,1,2,2-tetramethoxy-1,2-diphenyldisilane, 1,1,2,2-tetraethoxy-1,2-diphenyldisilane, 1,2-dimethoxy-1,1,2,2-tetramethyldisilane, 1,2-diethoxy-1,1,2,2-tetramethyldisilane, 1,2-dimethoxy-1,1,2,2-tetraphenyldisilane, 1,2-diethoxy-1,1,2,2-tetraphenyldisilane, bis(hexamethoxysilyl)methane, bis(hexaethoxysilyl)methane, bis(dimethoxymethylsilyl)methane, bis(diethoxymethylsilyl)methane, bis(dimethoxyphenylsilyl)methane, bis(diethoxyphenylsilyl)methane, bis(methoxydimethylsilyl)methane, bis(ethoxydimethylsilyl)methane, bis(methoxydiphenylsilyl)methane, and bis(ethoxydiphenylsilyl)methane.

When the B-staged organo polysilica resins comprise a hydrolyzate or partial condensate of organosilanes of formula (II), c may be 0, provided that at least one of $R^1$ and $R^5$ are not hydrogen. In an alternate embodiment, the B-staged organo polysilica resins may comprise a cohydrolyzate or partial cocondensate of organosilanes of both formulae (I) and (II). In such cohydrolyzates or partial cocondensates, c in formula (II) can be 0, provided that at least one of R, $R^1$ and $R^5$ is not hydrogen. Suitable silanes of formula (II) where c is 0 include, but are not limited to, hexamethoxydisilane, hexaethoxydisilane, hexaphenoxydisilane, 1,1,1,2,2-pentamethoxy-2-methyldisilane, 1,1,1,2,2-pentaethoxy-2-methyldisilane, 1,1,1,2,2-pentamethoxy-2-phenyldisilane, 1,1,1,2,2-pentaethoxy-2-phenyldisilane, 1,1,2,2-tetramethoxy-1,2-dimethyldisilane, 1,1,2,2-tetraethoxy-1,2-dimethyldisilane, 1,1,2,2-tetramethoxy-1,2-diphenyldisilane, 1,1,2,2-tetraethoxy-1,2-diphenyldisilane, 1,1,2-trimethoxy-1,2,2-trimethyldisilane, 1,1,2-triethoxy-1,2,2-trimethyldisilane, 1,1,2-trimethoxy-1,2,2triphenyldisilane, 1,1,2-triethoxy-1,2,2-triphenyldisilane, 1,2-dimethoxy-1,1,2,2-tetramethyldisilane, 1,2-diethoxy-1,1,2,2-tetramethyldisilane, 1,2-dimethoxy-1,1,2,2-tetraphenyldisilane, and 1,2-diethoxy-1,1,2,2-tetraphenyldisilane.

It will be appreciated that prior to any curing step, the B-staged organo polysilica resins of the present invention may include one or more of hydroxyl or alkoxy end capping or side chain functional groups. Such end capping or side chain functional groups are known to those skilled in the art.

In one embodiment, particularly suitable B-staged organo polysilica resins are hydrolyzates or partial condensates of compounds of formula (I). Such B-staged organo polysilica resins have the formula (III):

$$((R^7R^8SiO)_e(R^9SiO_{1.5})_f(R^{10}SiO_{1.5})_g(SiO_2)_r)_n \quad (III)$$

wherein $R^7$, $R^8$, $R^9$ and $R^{10}$ are independently selected from hydrogen, ($C_1$–$C_6$)alkyl, aryl, and substituted aryl; e, g and r are independently a number from 0 to 1; f is a number from 0.2 to 1; n is integer from about 3 to about 10,000; provided that e+f+g+r=1; and provided that at least one of $R^7$, $R^8$ and $R^9$ is not hydrogen. In the above formula (III), e, f, g and r represent the mole ratios of each component. Such mole ratios can be varied between 0 and about 1. It is preferred that e is from 0 to about 0.8. It is also preferred that g is from 0 to about 0.8. It is further preferred that r is from 0 to about 0.8. In the above formula, n refers to the number of repeat units in the B-staged material. Preferably, n is an integer from about 3 to about 1000.

Suitable organo polysilica resins include, but are not limited to, silsesquioxanes, partially condensed halosilanes or alkoxysilanes such as partially condensed by controlled hydrolysis tetraethoxysilane having number average molecular weight of about 500 to about 20,000, organically modified silicates having the composition $RSiO_3$, $O_3SiRSiO_3$, $R_2SiO_2$ and $O_2SiR_3SiO_2$ wherein R is an organic substituent, and partially condensed orthosilicates having $Si(OR)_4$ as the monomer unit. Silsesquioxanes are polymeric silicate materials of the type $RSiO_{1.5}$ where R is an organic substituent. Suitable silsesquioxanes are alkyl silsesquioxanes such as methyl silsesquioxane, ethyl silsesquioxane, propyl silsesquioxane, butyl silsesquioxane and the like; aryl silsesquioxanes such as phenyl silsesquioxane and tolyl silsesquioxane; alkyl/aryl silsesquioxane mixtures such as a mixture of methyl silsesquioxane and phenyl silsesquioxane; and mixtures of alkyl silsesquioxanes such as methyl silsesquioxane and ethyl silsesquioxane. B-staged silsesquioxane materials include homopolymers of silsesquioxanes, copolymers of silsesquioxanes or mixtures thereof. Such materials are generally commercially available or may be prepared by known methods.

It is preferred that the B-staged organo polysilica resin comprises a silsesquioxane, and more preferably methyl silsesquioxane, ethyl silsesquioxane, propyl silsesquioxane, iso-butyl silsesquioxane, tert-butyl silsesquioxane, phenyl silsesquioxane, tolyl silsesquioxane, benzyl silsesquioxane or mixtures thereof. Methyl silsesquioxane, phenyl silsesquioxane and mixtures thereof are particularly suitable. Other useful silsesquioxane mixtures include mixtures of hydrido silsesquioxanes with alkyl, aryl or alkyl/aryl silsesquioxanes. Typically, the silsesquioxanes useful in the present invention are used as oligomeric materials, generally having from about 3 to about 10,000 repeating units.

Particularly suitable organo polysilica B-staged resins are cohydrolyzates or partial condensates of one or more organosilanes of formulae (I) and/or (II) and one or more tetrafunctional silanes having the formula $SiY_4$, where Y is any hydrolyzable group as defined above. Suitable hydrolyzable groups include, but are not limited to, halo, ($C_1$–$C_6$) alkoxy, acyloxy and the like. Preferred hydrolyzable groups are chloro and ($C_1$–$C_2$)alkoxy. Suitable tetrafunctional silanes of the formula $SiY_4$ include, but are not limited to, tetramethoxysilane, tetraethoxysilane, tetrachlorosilane, and the like. Particularly suitable silane mixtures for preparing the cohydrolyzates or partial cocondensates include: methyl triethoxysilane and tetraethoxysilane; methyl trimethoxysilane and tetramethoxysilane; phenyl triethoxysilane and tetraethoxysilane; methyl triethoxysilane and phenyl triethoxysilane and tetraethoxysilane; ethyl triethoxysilane and tetramethoxysilane; and ethyl triethoxysilane and tetraethoxysilane. The ratio of such organosilanes to tetrafunctional silanes is typically from 99:1 to 1:99, preferably from 95:5 to 5:95, more preferably from 90:10 to 10:90, and still more preferably from 80:20 to 20:80.

In a particular embodiment, the B-staged organo polysilica resin is a cohydrolyzate or partial cocondensate of one or more organosilanes of formula (I) and a tetrafunctional silane of formula $SiY_4$. In another embodiment, the B-staged organo polysilica resin is a cohydrolyzate or partial cocondensate of one or more organosilanes of formula (II) and a tetrafunctional silane of formula $SiY_4$. In still another embodiment, the B-staged organo polysilica resin is a cohydrolyzate or partial cocondensate of one or more organosilanes of formula (I), one or more silanes of formula (II) and a tetrafunctional silane of formula $SiY_4$. The B-staged organo polycilica resins of the present invention include a non-hydrolyzed or non-condensed silane of one or more silanes of formulae (I) or (II) with the hydrolayzate or partial condensate of one or more silanes of formulae (I) or (II). In a further embodiment, the B-staged organo polysilica resin comprises a silane of formula (II) and a hydrolyzate of partial condensate of one or more organosilanes of formula (I), and preferably a co-hydrolyzate or partial cocondensate of one or more organosilanes of formula (I) with a tetrafunctional silane of the formula $SiY_4$ where Y is as defined above. Perferably, such B-staged organo polysilica resin comprises a mixture of one ore more silanes of formula (II) and a cohydrolyzate or partial cocondensate having the formula $(RSiO_{1.5})(SiO_2)$ where R is as defined above.

When organosilanes of formula (I) are cohydrolyzed or cocondensed with a tetrafunctional silane, it is preferred that the organosilane of formula (I) has the formula $RSiY_3$, and preferably is selected from methyl trimethoxysilane, methyl triethoxysilane, ethyl trimethoxysilane, ethyl triethoxysilane, phenyl trimethoxysilane, phenyl triethoxysilane and mixtures thereof. It is also preferred that the tetrafunctional silane is selected from tetramethoxysilane and tetraethoxysilane.

Such tetrafunctional silane-containing cohydrolyzates or partial cocondensates also suffer from storage stability shortcomings and must be stored and shipped cold. Thus, such cohydrolyzates also benefit from the present invention.

Any organic acid having at least 2 carbons and having an acid dissociation constant ("pKa") of about 1 to about 4 at 25° C. is suitable. Preferred organic acids have a pKa of about 1.1 to about 3.9, and more preferably about 1.2 to about 3.5. Organic acids capable of functioning as chelating agents are preferred. Such chelating organic acids include polycarboxylic acids such as di-, tri-, tetra- and higher carboxylic acids, and carboxylic acids substituted with one or more of hydroxyls, ethers, ketones, aldehydes, amine, amides, imines, thiols and the like. Preferred chelating organic acids are polycarboxylic acids and hydroxy-substituted carboxylic acids. The term "hydroxy-substituted carboxylic acids" includes hydroxy-substituted polycarboxylic acids. Suitable organic acids include, but are not limited to: oxalic acid, malonic acid, methylmalonic acid, dimethylmalonic acid, maleic acid, malic acid, citramalic acid, tartaric acid, phthalic acid, citric acid, glutaric acid, glycolic acid, lactic acid, pyruvic acid, oxalacetic acid, α-ketoglutaric acid, salicylic acid and acetoacetic acid. Preferred organic acids are oxalic acid, malonic acid, dimethylmalonic acid, citric acid and lactic acid, and more preferably malonic acid. Mixtures of organic acids may be advantageously used in the present invention. Those skilled in the art will realize that polycarboxylic acids have a pKa value for each carboxylic acid moiety in the compound. Only one of the pKa values in such polycarboxylic acids needs to be within the range of 1 to 4 at 25° C. for the organic acid to be suitable for use in the present invention.

The organic acids are present in a stabilizing amount. Such stabilizing amount is an amount less than that amount sufficient to cause condensation or curing of the B-staged organo polysilica resin. Typically, the amount of organic acid is 1 to 10,000 ppm, preferably from 5 to 5000 ppm, more preferably from 10 to 2500 ppm, and still more preferably from 10 to 1,000 ppm. The organic acids are generally commercially available from a number of sources.

The stable compositions of the invention are substantially free of alcohol of reaction. By "substantially free of alcohol of reaction" it is meant that the compositions contain ≦5% by weight of alcohol of reaction based on the total weight of the composition, preferably ≦4%, more preferably ≦3%, still more preferably ≦2.5%, and even more preferably ≦2%. The term "alcohol of reaction" refers to the alcohol generated during the condensation of an organo alkoxy silane monomer, e.g. an organo trialkoxysilane or a diorgano dialkoxysilane, to form the B-staged organo polysilica resin. For example, when methyl triethoxysilane is used as the monomer, the alcohol of reaction generated during condensation is ethanol. In the case of phenyl trimethoxysilane, methanol is the alcohol of reaction that is generated during the condensation reaction. Such alcohols of reaction are typically lower aliphatic alcohols, and more typically are methanol, ethanol, propanol and butanol.

It is preferred that the present compositions are substantially free of water. By "substantially free of water" it is meant that the compositions contain ≦2.5% water, by weight, based on the total weight of the composition. Preferably, the amount of water in the present compositions is ≦2%, more preferably ≦1% and still more preferably ≦0.5% by weight.

In one embodiment, it is preferred that the present compositions are substantially free of an alkaline condensation catalyst. The term "substantially free of an alkaline condensation catalyst" means that the compositions contain less than 0.001% based on the weight of the B-staged organo polysilicon resin. Such alkaline condensation catalysts include quaternary ammonium compounds and quaternary phosphonium compounds.

When the present compositions include a B-staged organo polysilica resin that is a hydrolyzate or partial condensate of a compound of formula (II), it is preferred that such compositions are substantially free of a combination of a β-diketone and a metal chelate compound having the formula $R^{10}_p(M)(OR^{11})_{q-p}$ where in $R^{10}$ is a chelating agent; M is a metal atom; $R^{11}$ is a $(C_2-C_5)$alkyl or $(C_6-C_{20})$aryl; q is the valence of the metal; and p is an integer from 1 to q. So used herein, "substantially free" means less than 0.5 mmol of metal chelate are present, preferably less than 0.1 mmol. It is preferred that such compositions are free of such combination of a β-diketone and a metal chelate. Particularly suitable compositions including an organo polysilica resin of formula (II) are substantially free of the above metal chelates alone. Other suitable compositions are substantially free of β-diketone, i.e. the compositions contain less than 1% by weight based on the weight of the composition, preferably less than 0.5% by weight, and more preferably less than 0.1% by weight. It is further preferred that such compositions are free of a β-diketone alone.

The present compositions may further include one or more organic solvents. Any organic solvents which do not destabilize the composition may be used, such as ketones, glycols, glycol ethers, glycol esters, esters, and the like. Suitable organic solvents include, but are not limited to: methyl isobutyl ketone, diisobutyl ketone, 2-heptanone, γ-butyrolactone, ε-caprolactone, propyleneglycol monomethyl ether acetate, propyleneglycol monomethyl ether, diphenyl ether, anisole, n-amyl acetate, n-butyl acetate, cyclohexanone, N-methyl-2-pyrrolidone, N,N'-dimethylpropyleneurea, mesitylene, xylenes and ethyl lactate. Preferred solvents are propyleneglycol monomethyl ether acetate, propyleneglycol monomethyl ether, 2-heptanone and ethyl lactate.

One or more photosensitive or thermally sensitive base generators may be added to the present copositions to aid in curing the B-staged organo polysilica resin. The photosensitive or thermally sensitive base generators are typically protected by a protecting group and do not accelerate the condensation reaction or curing of the B-staged organo polysilica resin until the free base is liberated by cleavage of the protecting group with heat or light. At room temperature the thermal and photosensitive base generators are substantially inert to the B-staged organo polysilica resin. Preferred photosensitive base generators are photosensitive amine generators. Suitable photosensitive amine generators are urethanes (carbamate derivatives derived from substituted o-nitrobenzyl alcohols and mono or dilsocyanates). A suitable photosensitive amine generator is o-nitrobenzylcarbamate. Another suitable photosensitive amine generator is t-butyl carbamate. Other suitable photosensitive amine generators include benzyl carbamates (e.g., amines protected by a benzyloxycarbonyl substituent), benzyl sulfonamides, benzyl quaternary ammonium salts, imines, iminium salts and cobalt-amine complexes. Suitable photosensitive amine generators are (α-methyl-2-nitrobenzyloxy carbonyl) carbamate of a primary or secondary amine, diamine or polyamine, e.g., bis [α-methyl-2'-nitrobenzyloxy) carbonyl] hexane-1,6-diamine. Suitable photosensitive amine generators have the formula: R'R"N—CO—OR'" where R' and R" are independently hydrido or lower ($C_1$-$C_6$) alkyl and R'" is nitrobenzyl (e.g., ortho) or a methyl nitrobenzyl. Other photosensitive amine generators suitable for use in the present inventions are well known to those skilled in the art. Conveniently, the photosensitive amine generator will absorb light in the 225–500 nm region to generate free amines.

Suitable thermal base generators for use in the present invention are bases which have a thermally removable protecting group. Heating the base to an elevated temperature of about 75° to about 200° C. releases the free base which can then catalyze the condensation or curing reaction. Suitable thermal base generators include carbamates and organic quaternary ammonium salts. Suitable thermally sensitive amine generators include t-butoxycarbamates of primary and secondary amines, diamines and polyamines such as polyalkylene (e.g., $C_2$) imine and amino substituted (i) polyethers, (ii) polystyrenes (iii) polymethacrylates and (iv) polysiloxanes. A suitable thermal amine generator is bis (t-butoxycarbonyl)-4,7,10 trioxa-1,13-tridecanediamine. Suitable thermal base generators have the formula: R'R"N—CO—OR'" where R' and R'" are independently hydrido or lower ($C_1$-$C_6$) alkyl and R'" is t-butyl. Other thermal base generators are well known to those skilled in the art.

When organic solvents are used, they are typically used in an amount from 60 to 99% of total composition, preferably from 70 to 95%. It will be appreciated that mixtures of organic solvents may be advantageously used according to the present invention. When such mixtures are used, the total amount of organic solvent in the composition is typically from 60 to 99%. Suitable organic solvents are generally commercially available from a variety of suppliers and may be used without further purification.

The present compositions are prepared by combining the organo polysilica resin with the organic acid and optionally organic solvent. The components may be combined in any order.

The organic acid of the present invention stabilizes the B-staged organo polysilica resin against further condensation or polymerization. Such continued condensation or polymerization is evidenced by increased viscosity of the resin and will ultimately result in gellation of the resin. Control of such condensation is important in order to provide material having a consistent molecular weight. An advantage of the present compositions is that they are stable, i.e. show reduced condensation or polymerization upon storage, for longer periods of time and at higher temperatures than conventional B-staged organo polysilica compositions. By "stable" it is meant that the viscosity of a B-staged organo polysilica resin increases less than 35%, and preferably less than 30%, after 96 hours of storage at 40° C., where viscosity is measured in centistokes using a commercially available viscometer at 25° C. Such stable B-staged organo polysilica resins are preferably free of gel formation after 1000 hours of storage at 40° C., and preferably after 1400 hours of storage at 40° C.

When the organo polysilica resin is to be used as a dielectric material, such as in the manufacture of integrated circuits, it may optionally contain a porogen. Porogens are added to the B-staged organo polysilica resins in order to form porous films after curing of a resin coating and subsequent removal of the porogen material. Such porous coatings are useful in integrated circuit manufacture as they possess lower dielectric constants (and are therefore better insulators) than the corresponding non-porous coating, and in optical coatings particularly in low refractive coatings.

A wide variety of porogens may be used with the organo polysilica resins. Suitable porogens include those disclosed in U.S. Pat. No. 5,895,263 (Carter et al.) and U.S. Pat. No. 6,271,273 B1 (You et al.). It is preferred that the porogens are compatible with the organo polysilica resins. By "compatible" is meant that a composition of B-staged organo polysilica resin and porogen are optically transparent to visible light. It is preferred that a solution of B-staged organo polysilica resin and porogen, a film or layer including a composition of B-staged organo polysilica resin and porogen, a composition including an organo polysilica resin having porogen dispersed therein, and the resulting porous dielectric material after removal of the porogen are all optically transparent to visible light. By "substantially compatible" is meant that a composition of B-staged organo polysilica resin and porogen is slightly cloudy or slightly opaque. Preferably, "substantially compatible" means at least one of a solution of B-staged organo polysilica resin and porogen, a film or layer including a composition of B-staged organo polysilica resin and porogen, a composition including an organo polysilica resin having porogen dispersed therein, and the resulting porous organo polysilica resin after removal of the porogen is slightly cloudy or slightly opaque.

Preferably, the porogens are dispersible, miscible or otherwise substantially compatible with the host dielectric matrix material in solution and in any thin organo polysilica film. Thus, the porogen must be soluble in the same solvent or mixed solvent system as the host organo polysilica B-staged material. Also, the porogen must be present within this solution as substantially discrete, substantially non-aggregated or substantially non-agglomerated particles in order to achieve the desired benefit of substantially uniformly dispersed pores with a size comparable to that of the porogen's size.

Preferred porogens are those disclosed in U.S. Pat. No. 6,271,273 B1 (You et al.), hereby incorporated by reference, and are cross-linked polymeric particles including as polymerized units at least one of silyl-containing monomers or poly(alkylene oxide) monomers, and one or more cross-linking agents. Suitable monomers which may be copolymerized with the one or more silyl-containing monomers or one or more poly(alkylene oxide) monomers or mixtures thereof include, but are not limited to: (meth)acrylic acid, (meth)acrylamides, alkyl (meth)acrylates, alkenyl (meth) acrylates, aromatic (meth)acrylates, vinyl aromatic monomers, nitrogen-containing compounds and their thio-analogs, and substituted ethylene monomers. Such porogens may be prepared by a variety of polymerization methods, including emulsion polymerization and solution polymerization, and preferably by solution polymerization.

The polymeric porogens include as polymerized units at least one silyl-containing monomer or poly(alkylene oxide) monomer. Such silyl-containing monomers or poly(alkylene oxide) monomers may be used to form the uncrosslinked polymer, used as the crosslinker, or both. Any monomer containing silicon may be useful as the silyl-containing monomers in the present invention. The silicon moiety in such silyl-containing monomers may be reactive or unreactive. Exemplary "reactive" silyl-containing monomers include those containing one or more alkoxy or acetoxy groups, such as, but not limited to, trimethoxysilyl-containing monomers, triethoxysilyl-containing monomers, methyl dimethoxysilyl-containing monomers, and the like. Exemplary "unreactive" silyl containing monomers include those containing alkyl groups, aryl groups, alkenyl groups or mixtures thereof, such as but are not limited to, trimethylsilyl-containing monomers, triethylsilyl-containing monomers, phenyldimethylsilyl-containing monomers, and the like. Polymeric porogens including silyl-containing monomers as polymerized units are intended to include such porogens prepared by the polymerization of a monomer containing a silyl moiety. It is not intended to include a linear polymer that contains a silyl moiety only as end capping units.

Suitable silyl-containing monomers include, but are not limited to, vinyltrimethylsilane, vinyltriethylsilane, vinyltrimethoxysilane, vinyltriethoxysilane, γ-trimethoxysilylpropyl (meth)acrylate, divinylsilane, trivinylsilane, dimethyldivinylsilane, divinylmethylsilane, methyltrivinylsilane, diphenyldivinylsilane, divinylphenylsilane, trivinylphenylsilane, divinylmethylphenylsilane, tetravinylsilane, dimethylvinyldisiloxane, poly(methylvinylsiloxane), poly(vinylhydrosiloxane), poly(phenylvinylsiloxane), allyloxy-tert-butyldimethylsilane, allyloxytrimethylsilane, allyltriethoxysilane, allyltri-iso-propylsilane, allyltrimethoxysilane, allyltrimethylsilane, allyltriphenylsilane, diethoxy methylvinylsilane, diethyl methylvinylsilane, dimethyl ethoxyvinylsilane, dimethyl phenylvinylsilane, ethoxy diphenylvinylsilane, methyl bis(trimethylsilyloxy)vinylsilane, triacetoxyvinylsilane, triethoxyvinylsilane, triethylvinylsilane, triphenylvinylsilane, tris(trimethylsilyloxy)vinylsilane, vinyloxytrimethylsilane and mixtures thereof.

The amount of silyl-containing monomer useful to form the porogens of the present invention is typically from about 1 to about 99% wt, based on the total weight of the monomers used. It is preferred that the silyl-containing monomers are present in an amount of from 1 to about 80% wt, and more preferably from about 5 to about 75% wt.

Suitable poly(alkylene oxide) monomers include, but are not limited to, poly(propylene oxide) monomers, poly(ethylene oxide) monomers, poly(ethylene oxide/propylene oxide) monomers, poly(propylene glycol) (meth)acrylates, poly(propylene glycol) alkyl ether (meth)acrylates, poly(propylene glycol) phenyl ether (meth)acrylates, poly(propylene glycol) 4-nonylphenol ether (meth)acrylates, poly(ethylene glycol) (meth)acrylates, poly(ethylene glycol) alkyl ether (meth)acrylates, poly(ethylene glycol) phenyl ether (meth)acrylates, poly(propylene/ethylene glycol) alkyl ether (meth)acrylates and mixtures thereof. Preferred poly(alkylene oxide) monomers include trimethoylolpropane ethoxylate tri(meth)acrylate, trimethoylolpropane propoxylate tri(meth)acrylate, poly(propylene glycol) methyl ether (meth)acrylate, and the like. Particularly suitable poly(propylene glycol) methyl ether (meth)acrylate monomers are those having a molecular weight in the range of from about 200 to about 2000. The poly(ethylene oxide/propylene oxide) monomers useful in the present invention may be linear, block or graft copolymers. Such monomers typically have a degree of polymerization of from about 1 to about 50, and preferably from about 2 to about 50.

Typically, the amount of poly(alkylene oxide) monomers useful in the porogens of the present invention is from about 1 to about 99% wt, based on the total weight of the monomers used. The amount of poly(alkylene oxide) monomers is preferably from about 2 to about 90% wt, and more preferably from about 5 to about 80% wt.

The silyl-containing monomers and the poly(alkylene oxide) monomers may be used either alone or in combination to form the porogens of the present invention. It is preferred that the silyl-containing monomers and the poly(alkylene oxide) monomers are used in combination. In general, the amount of the silyl-containing monomers or the poly(alkylene oxide) monomers needed to compatiblize the porogen with the dielectric matrix depends upon the level of porogen loading desired in the matrix, the particular composition of the organo polysilica dielectric matrix, and the composition of the porogen polymer. When a combination of silyl-containing monomers and the poly(alkylene oxide) monomers is used, the amount of one monomer may be decreased as the amount of the other monomer is increased. Thus, as the amount of the silyl-containing monomer is increased in the combination, the amount of the poly(alkylene oxide) monomer in the combination may be decreased.

The porogen polymers are typically cross-linked particles and have a molecular weight or particle size suitable for use as a modifier in advanced interconnect structures in electronic devices. Typically, the useful particle size range for such applications is up to about 1,000 nm, such as that having a mean particle size in the range of about 0.5 to about 1000 nm. It is preferred that the mean particle size is in the range of about 0.5 to about 200 nm, more preferably from about 0.5 to about 50 nm, still more preferably from about 1 nm to about 20 nm, and most preferably from about 1 to about 10 nm. An advantage of the present process is that the size of the pores formed in the dielectric matrix upon removal of the porogen are substantially the same size, i.e., dimension, as the size of the porogen particles used. Thus, the porous organo polysilica dielectric material made by this process has substantially uniformly dispersed pores with substantially uniform pore sizes having a mean pore size in the range of from 0.5 to 1000 nm, preferably 0.5 to 200 nm, more preferably 0.5 and 50 nm and most preferably 1 to 20 nm.

When used, porogens may be combined with the organo polysilica resin before or after the addition of the stabilizing amount of organic acid and optional solvent. Preferably, the porogens are dissolved or dispersed in a solvent and then added to a mixture of the B-staged organo polysilica resin, acid and solvent. The solvent used to dissolve or disperse the porogens may be the same or different from the one used to prepare the stable B-staged organo polysilica composition. The porogen particles are dispersed or dissolved within the composition.

In an alternate embodiment, an organic carboxylic acid or organic carboxylic acid equivalent, such as an anhydride, may be incorporated into the porogen particles used. Such porogen particles may incorporate the organic carboxylic acid or organic carboxylic acid equivalents as monomers or cross-linking agents. It is preferred that the organic acid-containing monomers or cross-linking agents contain two or more carboxylic acid moieties, and preferably two carboxylic acid moieties. Suitable monomers and cross-linking agents include, but are not limited to, maleic acid, maleic anhydride, vinyl phthalic anhydride, norbornene dicarboxylic anhydride, acrylic acid anhydride, methacrylic anhydride, itaconic acid, itaconic anhydride, salicylic acid ester of (meth)acrylic acid, citraconic acid, citric acid ester of (meth)acrylic acid, vinyl naphthalene dicarboxylic acid anhydride, N,N-(diacetic acid) (meth)acrylamide, o-, m- or p-, N,N-(diacetic acid)amino-methyl styrene, and the like.

Thus, the present invention also provides a stable composition including one or more B-staged organo polysilica resin and a polymeric porogen including as polymerized units one or more carboxylic acid or anhydride-containing monomers or cross-linking agents. Such compositions are stable without the need for an added organic carboxylic acid of the present invention. However, the addition of an organic carboxylic acid having 2 carbons or more and a pKa value of 1 to 4 enhances the stabilization of such compositions.

The compositions of the present invention are deposited on a substrate by methods known in the art, such as spin coating, spray coating or doctor blading, to form a film or layer. After being deposited on a substrate, the B-staged organo polysilica resin is then substantially cured to form a rigid, cross-linked organo polysilica matrix material. If the composition contains a porogen, such curing step is performed without substantially removing the porogen particle. The curing of the organo polysilica resin material may be by any means known in the art including, but not limited to, heating to induce condensation or e-beam irradiation to facilitate free radical coupling of the oligomer or monomer units. Typically, the B-staged material is cured by heating at an elevated temperature, e.g. either directly, e.g. heated at a constant temperature such as on a hot plate, or in a step-wise manner. Suitable temperatures for curing the B-staged organo polysilica resin are from about 200° to about 350° C. Such curing conditions are known to those skilled in the art.

Once the B-staged organo polysilica resin dielectric material is cured, the film is subjected to conditions which remove the optional porogen without substantially degrading the organo polysilica resin material, that is, less than 5% by weight of the resin material is lost. Typical methods of removal include, but are not limited to, exposure to heat or radiation, such as, but not limited to, UV, x-ray, gamma ray, alpha particles, neutron beam or electron beam. Heating is preferred for removal of the porogens. To remove the porogen thermally, the cured resin material can be heated by oven heating or microwave heating. Typically, the porogens are removed at temperatures in the range of 250° to 425° C. The porogens are typically heated for 1 to 120 minutes to effect removal. It will be recognized by those skilled in the art that the particular removal temperature of a thermally labile porogen will vary according to composition of the porogen.

Upon removal, the porogen polymer depolymerizes or otherwise breaks down into volatile components or fragments which are then removed from, or migrate out of, the dielectric matrix material yielding pores or voids, which fill up with the carrier gas used in the process. Thus, a porous organo polysilica resin material having voids is obtained, where the size of the voids is substantially the same as the particle size of the porogen. The resulting resin material having voids thus has a lower dielectric constant than such material without such voids.

Thus, the present invention provides a method of manufacturing an electronic device including forming a porous organo polysilica dielectric material including the steps of: a) disposing on an electronic device substrate a stable composition comprising a B-staged organo polysilica resin, porogen particles and an organic acid having 2 carbons or more and having a pKa of about 1 to about 4, wherein the composition is substantially free of alcohol of reaction; b) curing the B-staged organo polysilica resin to form an organo polysilica dielectric material; and c) removing the porogen particles to provide a porous organo polysilica material disposed on the substrate.

The following examples are presented to illustrate further various aspects of the present invention, but are not intended to limit the scope of the invention in any aspect.

EXAMPLE 1

To a commercially available B-staged methyl silsesquioxane resin (prepared from the hydrolysis of a mixture of methyl trialkoxysilane and tetraalkoxysilane in a ratio of approximately 8:2) in propylene glycol monomethyl ether acetate ("PGMEA") was added cross-linked porogen particles including as polymerized units at least one compound selected from silyl containing monomers or poly(alkylene oxide) monomers and one or more cross-linking agents in PGMEA. The amount of the porogen particles was sufficient to provide 30% by weight of porogen, based on the total weight of porogen and B-staged methylsilsesquioxane resin. Additional PGMEA was then added to produce a resin composition containing the desired solids level of 26.3%.

EXAMPLE 2

A 70 g sample of the resin composition of Example 1 was added to each of a number of jars. Samples A and B were controls and were used as is. An organic acid was added to each of the remaining samples and the samples thoroughly mixed. The particular organic acids and the amounts used are reported in Table 1. Some of the samples also contained added water, as shown in Table 1. The samples were stored in an oven at 40° C. for a period of time. At certain times, a 10 mL aliquot was removed from each sample and the viscosity measured using a Cannon-Fenske viscometer having a controlled temperature (25° C.) sample bath. The viscosity results, in centistokes, are reported in Table 1. The test was stopped for each sample when a gel was formed.

TABLE 1

| Sample | Organic Acid | Amount (wt %) | Water (wt %) | 0 hr (Cst) | 168 hr (Cst) | 501 hr (Cst) | 959 hr (Cst) | 1490 hr (Cst) | 1866 hr (Cst) | 2373 hr (Cst) |
|---|---|---|---|---|---|---|---|---|---|---|
| A+ | — | — | — | 5.16 | 13.2 | Gel | | | | |
| B+ | — | — | 1.0 | 5.9 | 44.5 | Gel | | | | |
| C* | Trifluoroacetic | 0.56 | — | 5.75 | 7.17 | 11.55 | 20.97 | Gel | | |
| D* | Trifluoroacetic | 0.5 | 1.0 | 6.57 | 9.67 | 20.2 | Gel | | | |
| E* | Formic | 0.5 | — | 4.8 | 5.37 | 7.37 | 13.77 | Gel | | |
| F* | " | 0.5 | 1.0 | 5.16 | 5.44 | 7.09 | 13.47 | Gel | | |
| G* | " | 0.11 | — | 5.16 | 5.63 | 7.98 | 33.81 | Gel | | |
| H* | " | 0.1 | 1.0 | 4.59 | 5.90 | 8.74 | 110.15 | Gel | | |
| I* | " | 1.0 | — | 4.89 | 5.61 | 7.04 | 13.34 | Gel | | |
| J* | Formic | 1.0 | 1.0 | 5.16 | 5.79 | 7.37 | 14.00 | Gel | | |
| K* | Propionic | 0.5 | — | 4.84 | 7.98 | Viscous | Gel | | | |
| L* | Propionic | 0.5 | 1.0 | 5.31 | 9.58 | Gel | | | | |
| M | Maleic | 0.5 | — | 5.01 | 5.27 | 6.25 | 7.73 | 9.94 | 12.61 | 22.45 |

TABLE 1-continued

| Sample | Organic Acid | Amount (wt %) | Water (wt %) | 0 hr (Cst) | 168 hr (Cst) | 501 hr (Cst) | 959 hr (Cst) | 1490 hr (Cst) | 1866 hr (Cst) | 2373 hr (Cst) |
|---|---|---|---|---|---|---|---|---|---|---|
| N | Maleic | 0.5 | 1.0 | 6.1 | 6.50 | 8.45 | 11.08 | 20.78 | 93.13 | Gel |
| O | Malonic | 0.5 | — | 5.16 | 5.16 | 5.25 | 5.96 | 6.08 | 6.79 | 7.46 |
| P | Malonic | 0.5 | 1.2 | 5.01 | 5.90 | 5.16 | 6.92 | 7.77 | 8.53 | 10.19 |
| Q | Salicylic | 0.5 | — | 5.58** | 5.16 | 6.57 | 6.34 | 9.36 | 12.25 | 23.44 |
| R | Salicylic | 0.5 | 1.0 | 4.89 | 5.90 | 6.02 | 6.97 | 9.25 | 13.77 | 20.62 |

+=Control;
*= Comparative;
**= average of 2 readings

The above results clearly show that the organic acids of the present invention provide B-staged organo polysilica resin compositions that are more stable, i.e. take much longer to gel, than other organic acids.

EXAMPLE 3

Example 1 was repeated except that the porogen particles were 29.8% by weight and the solids level was 25.4%.

EXAMPLE 4

A 100 g sample of the resin composition of Example 3 was added to each of a number of jars. Sample 1 was a control and was used as is. Malonic acid was added to each of samples and the samples were thoroughly mixed. The amounts of malonic acid used are reported in Table 2. Some of the samples also contained added water, as shown in Table 2. The samples were stored in an oven at 40° C. for a period of time. At certain times, a 10 mL aliquot was removed from each sample and the viscosity measured using a Cannon-Fenske viscometer having a controlled temperature (25° C.) sample bath. The viscosity results, in centistokes, are reported in Table 2. The test was stopped for each sample when a gel was formed.

These results demonstrate the superior stabilizing ability of malonic acid.

EXAMPLE 5

The procedure of Example 4 was repeated except that the samples were stored at room temperature. Sample 12 was a control and contained no added organic acid. Sample 13 contained malonic acid. These data are reported in Table 3.

TABLE 3

| Sample | Malonic Acid (wt %) | Water (wt %) | 0 hr (Cst) | 96 hr (Cst) | 338 hr (Cst) | 931 hr (Cst) | 1771 hr (Cst) | 3287 hr (Cst) |
|---|---|---|---|---|---|---|---|---|
| 12+ | 0 | 0 | 5.50 | 5.47 | 7.73 | 14.70 | Gel | |
| 13 | 0.49 | 0.6 | 5.58 | 5.37 | 5.93 | 6.64 | 6.24 | 7.06 |

+= Control

The above data demonstrate the effectiveness of organic acids at stabilizing B-staged organo polysilica resins at room temperature.

EXAMPLE 6

A control same (14) was prepared by combining a commercially available B-staged methyl silsequioxane resin (prepared from the hydrolysis of methyl trialkoxylsilane) in PGMEA with porogen particles A comparative sample (15) was prepared by combining the commercially available B-staged methyl silsequioxane resin of Example 1 in PGMEA with porogen particles and 5000 ppm of formic acid. The amount of porogen particles in both the control and

TABLE 2

| Sample | Malonic Acid (wt %) | Water (wt %) | 0 hr (Cst) | 96 hr (Cst) | 338 hr (Cst) | 931 hr (Cst) | 1771 hr (Cst) | 3287 hr (Cst) |
|---|---|---|---|---|---|---|---|---|
| 1+ | 0 | 0 | 5.57 | 8.17** | Gel | | | |
| 2 | 0.02 | 0.6 | 5.38 | 5.50 | 5.86 | 6.69 | 9.95 | Viscous |
| 3 | 0.1 | 0.2 | 5.51 | 5.57 | 5.68 | 6.08 | 7.14 | 9.86 |
| 4 | 0.1 | 1.01 | 5.44 | 5.54 | 5.98 | 6.66 | 7.87 | 13 |
| 5 | 0.3 | 0.04 | 5.51 | 5.11 | 5.90 | 6.21 | 7.36 | 9.71 |
| 6 | 0.3 | 0.6 | 5.63 | 5.50 | 6.16 | 6.62 | 7.77 | 11.1 |
| 7 | 0.3 | 0.6 | 5.73 | 5.48 | 6.05 | 6.78 | 7.97 | 13.51 |
| 8 | 0.3 | 1.16 | 5.62 | 5.65 | 6.07 | 6.95 | 8.25 | 13.95 |
| 9 | 0.5 | 0.2 | 5.53 | 5.43 | 5.91 | 6.72 | 7.72 | 11.5 |
| 10 | 0.5 | 1.0 | 6.01 | 5.86 | 6.28 | 7.70 | 8.47 | 14.16 |
| 11 | 0.58 | 0.6 | 5.80 | 5.86 | 6.18 | 7.10 | 8.64 | 13.69 |

+= Control;
**= average of 2 readings comparative samples was sufficient to provide 30% by weight of porogen, based on the total weight of the porogens and resin.

Four samples (16–19) were prepared by combining the commercially available B-staged methyl silsesquioxane resin of Example 1 in PGMEA with porogen particles and an amount of malonic acid. The amount of malonic acid in the samples 16, 17, 18 and 19 was 5000 ppm, 1000 ppm, 10 ppm and 100 ppm, respectively. The amount of porogen particles in each of samples 16–19 was sufficient to provide 23% by weight, based on the total weight of the porogens and resins.

The porogens in each sample 14–19 were the same and included as polymerized units one or more compounds selected from silyl-containing monomers or poly(alkylene oxide) monomers and one or more cross-linking agents.

Samples 4–19 were stored at room temperature and the samples were evaluated for changes in viscosity over time by continually recirculating each sample through a pump and an in-line 0.1 μm polypropylene filter casule. The sample viscosities were measured as reported in Example 2 are reported (in centistokes) in Table 4.

TABLE 4

| Time (days) | 14+ | 15++ | 16 | 17 | 18 | 19 |
|---|---|---|---|---|---|---|
| 0 | | 4.52 | 4.97 | 4.28 | 2.874 | 2.934 |
| 0.25 | 5.97 | | | | | |
| 11 | 5.9 | | | | | |
| 12 | | | | | 2.93 | 2.86 |
| 14 | | | 5.06 | | | |
| 15 | | 4.65 | | 4.24 | | |
| 34 | | | | | 2.93 | 2.84 |
| 35 | | | 5.34 | | | |
| 51 | | 4.87 | | | | |
| 54 | 5.88 | | | | 2.97 | 2.95 |
| 63 | | | 5.45 | | | |
| 64 | | | | 4.34 | | |
| 75 | | | | | 3.06 | 2.81 |
| 83 | 6.32 | | | | | |
| 84 | | | 5.46 | | | |
| 96 | | | | | 3.02 | 2.87 |
| 111 | 6.35 | | | | | |
| 112 | | | 5.86 | | | |
| 114 | | 4.90 | | 4.35 | | |
| 128 | | 5.21 | | 4.39 | | |
| 139 | 6.36 | | | | | |
| 163 | | 5.16 | | 4.54 | | |
| 184 | | 5.30 | | 4.68 | | |

+= Control;
++= Comparative

These data show that as little as 10 ppm of malonic acid is sufficient to stabilize a B-staged methyl silsesquioxane resin containing 23% porogen. The data also indicate that 5000 ppm malonic acid causes an increase in viscosity, i.e. causes condensation, of a B-staged methyl silsesquioxane containing 23% porogen, thus, 5000 ppm exceeds a stabilizing amount in these particular samples.

What is claimed is:

1. A stable composition comprising a B-staged organo polysilica resin and a stabilizing amount of an organic acid having 2 carbons or more and having a pKa of about 1 to about 4, wherein the organic acid is chosen from polycarboxylic acids and carboxylic acids substituted with one or more of hydroxyls, ethers, ketones, aldehydes, amines, amides, imines and thiols, wherein the composition is substantially free of alcohol of reaction.

2. The composition of claim 1 wherein the B-staged organo polysilica resin comprises a hydrolyzate or partial condensate of one or more silanes of formulae (I) or (II):

$$R_a SiY_{4-a} \quad (I)$$

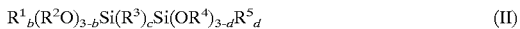

$$R^1{}_b(R^2O)_{3-b}Si(R^3)_c Si(OR^4)_{3-d}R^5{}_d \quad (II)$$

wherein R is hydrogen, $(C_1–C_8)$alkyl, aryl, and substituted aryl; Y is any hydrolyzable group; a is an integer of 0 to 2; $R^1$, $R^2$, $R^4$ and $R^5$ are independently selected from hydrogen, $(C_1–C_6)$alkyl, aryl, and substituted aryl; $R^3$ is selected from $(C_1–C_{10})$alkylene, $—(CH_2)_h—$, $—(CH_2)_{h1}-E_k-(CH_2)_{h2}—$, $—(CH_2)_h-Z$, arylene, substituted arylene, and arylene ether; E is selected from oxygen, $NR^6$ and Z; Z is selected from arylene and substituted arylene; $R^6$ is selected from hydrogen, $(C_1–C_6)$alkyl, aryl and substituted aryl; b and d are each an integer of 0 to 2; c is an integer of (1 to 6; and h, h1, h2 and k are independently an integer from 1 to 6; provided that at least one of R, $R^1$, $R^3$ and $R^5$ is not hydrogen.

3. The composition of claim 2 wherein the hydrolyzate or partial condensate further comprises a hydrolyzate or partial condensate of a tetrafunctional silane of the formula $SiY_4$, wherein Y is halo, $(C_1–C_6)$alkoxy or acyloxy.

4. The composition of claim 1 wherein the B-staged organo polysilica resin comprises an alkyl silsesquioxane, aryl silsesquioxane or a mixture thereof.

5. The composition of claim 1 wherein the organic acid is selected from the group consisting of oxalic acid, malonic acid, methylmalonic acid, dimethylmalonic acid, maleic acid, citramalic acid, malic acid, tartaric acid, phthalic acid, citric acid, glutaric acid, glycolic acid, lactic acid, pyruvic acid, oxalacetic acid, α-ketoglutaric acid, salicylic acid and acetoacetic acid.

6. The composition of claim 1 wherein the organic acid is present in an amount of 1 to 10,000 ppm.

7. The composition of claim 1 further comprising porogens.

8. The composition of claim 7 wherein the porogens are polymeric particles comprising as polymerized units at least one silyl-containing monomer or poly(alkylene oxide) monomer and one or more cross-linking agents.

9. A stable composition comprising a B-staged organo polysilica resin, porogens and a stabilizing amount of an organic acid having 2 carbons or more and having a pKa of about 1 to about 4 and being capable of functioning as a chelating agent, wherein the composition is substantially free of alcohol of reaction.

10. The composition of claim 9 wherein B-staged organo polysilica resin comprises a hydrolyzate or partial condensate of one or more silanes of formulae (I) or (II):

$$R_a SiY_{4-a} \quad (I)$$

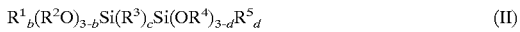

$$R^1{}_b(R^2O)_{3-b}Si(R^3)_c Si(OR^4)_{3-d}R^5{}_d \quad (II)$$

wherein R is hydrogen, $(C_1–C_8)$alkyl, aryl, and substituted aryl; Y is any hydrolyzable group; a is an integer of 0 to 2; $R^1$, $R^2$, $R^4$ and $R^5$ are independently selected from hydrogen, $(C_1–C_6)$alkyl, aryl and substituted aryl; $R^3$ is selected from $(C_1–C_{10})$alkylene, $—(CH_2)_h—$, $—(CH_2)_{h1}-E_k-(CH_2)_{h2}—$, $—(CH_2)_h-Z$, arylene, substituted arylene, and arylene ether; E is selected from oxygen, $NR^6$ and Z; Z is selected from arylene and substituted arylene; $R^6$ is selected from hydrogen, $(C_1–C_6)$alkyl, aryl and substituted aryl; b and d are each an integer of 0 to 2; c is an integer of 0 to 6; and h, $h_1$, $h_2$ and k are independently an integer from 1 to 6; provided that at least one of R, $R^1$, $R^3$ and $R^5$ is not hydrogen.

11. The composition of claim 10 wherein the hydrolyzate or partial condensate further comprises a hydrolyzate or partial condensate of a tetrafunctional silane of the formula $SiY_4$, wherein Y is halo, $(C_1–C_6)$alkoxy or acyloxy.

12. The composition of claim 9 wherein the porogens are polymeric particles comprising as polymerized units at least one silyl-containing monomer or poly(alkylene oxide) monomer and one or more cross-linking agents.

13. The composition of claim 9 wherein the organic acid is selected from the group consisting of oxalic acid, malonic acid, methylmalonic acid, dimethylmalonic acid, maleic acid, malic acid, tartaric acid, phthalic acid, citric acid, glutaric acid, glycolic acid, lactic acid, pyruvic acid, oxalacetic acid, α-ketoglutaric acid, salicylic acid and acetoacetic acid.

14. The composition of claim 9 wherein the organic acid is present in an amount of 1 to 10,000 ppm.

15. A method of stabilizing a B-staged organo polysilica resin comprising the steps of: a) providing a B-staged organo polysilica resin substantially free of alcohol of reaction; and b) adding a stabilizing amount of amount of organic acid having at least 2 carbons and a pKa of about 1 to about 4, wherein the organic acid is chosen from polycarboxylic acids and carboxylic acids substituted with one or more of hydroxyls, ethers, ketones, aldehydes, amines, amides, imines and thiols.

16. A method of manufacturing an electronic device comprising forming a porous organo polysilica dielectric material comprising the steps of: a) disposing on an electronic device substrate the stable composition of claim 9; b) curing the B-staged organo polysilica resin to form an organo polysilica dielectric material; and c) removing the porogens to provide a porous organo polysilica material disposed on the substrate.

17. A stable composition comprising a B-staged organo polysilica resin and a polymeric porogen, the polymeric porogen comprising as polymerized units one or more compounds chosen from carboxylic acid-containing monomers, anhydride-containing monomers, carboxylic acid-containing cross-linking agents and anhydride-containing cross-linking agents, the carboxylic acid-containing monomers and cross-linking agents comprising two or more carboxylic acid moieties.

18. The composition of claim 17 wherein the one or more compounds are chosen from maleic acid, maleic anhydride, vinyl phthalic anhydride, norbornene dicarboxylic anhydride, acrylic acid anhydride, methacrylic anhydride, itaconic acid, itaconic anhydride, salicylic acid ester of (meth)acrylic acid, citraconic acid, citric acid ester of (meth) acrylic acid, vinyl naphthalene dicarboxylic acid anhydride, N,N-(diacetic acid) (meth)acrylamide, o-N,N-(diacetic acid) amino-methyl styrene, m-N,N-(diacetic acid)amino-methyl styrene and p-N,N-(diacetic acid)amino-methyl styrene.

* * * * *